UNITED STATES PATENT OFFICE.

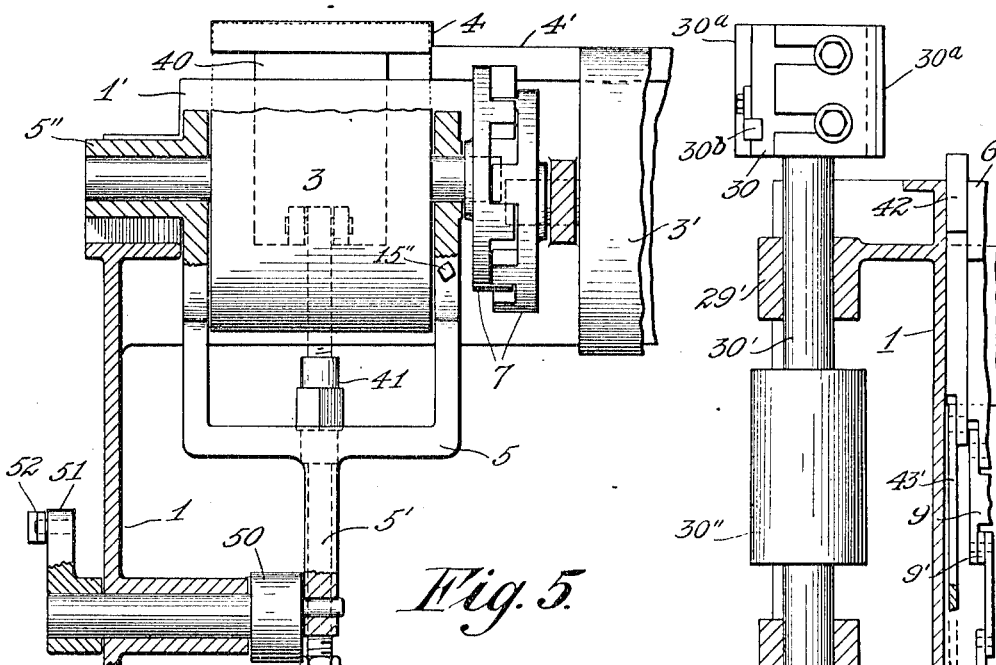
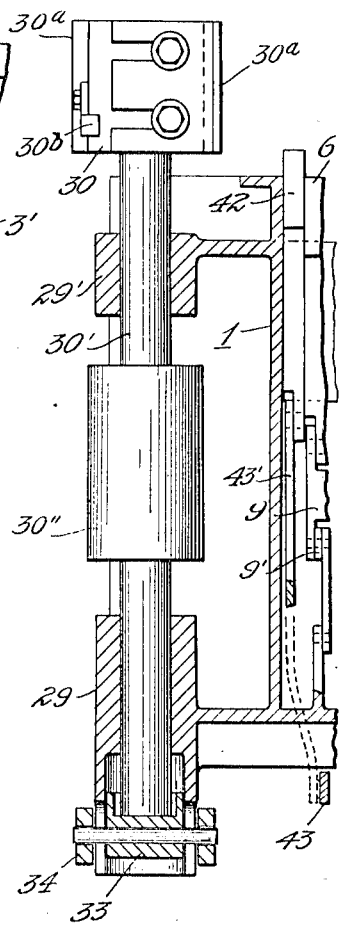
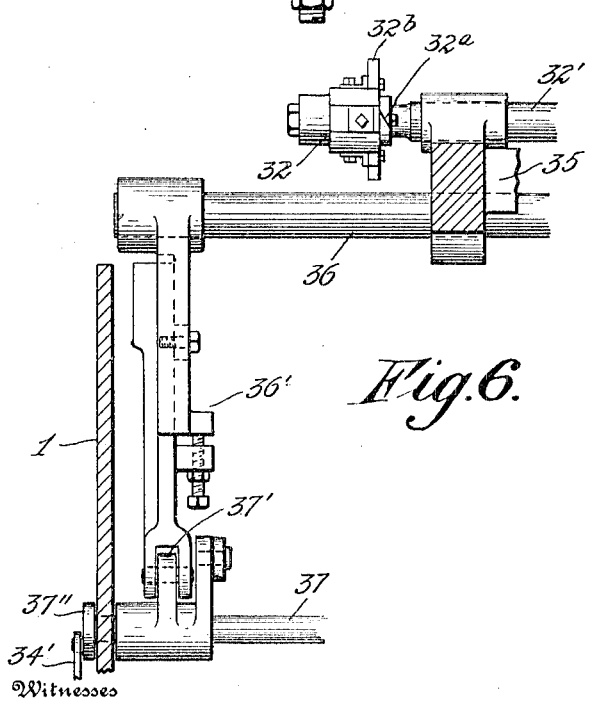

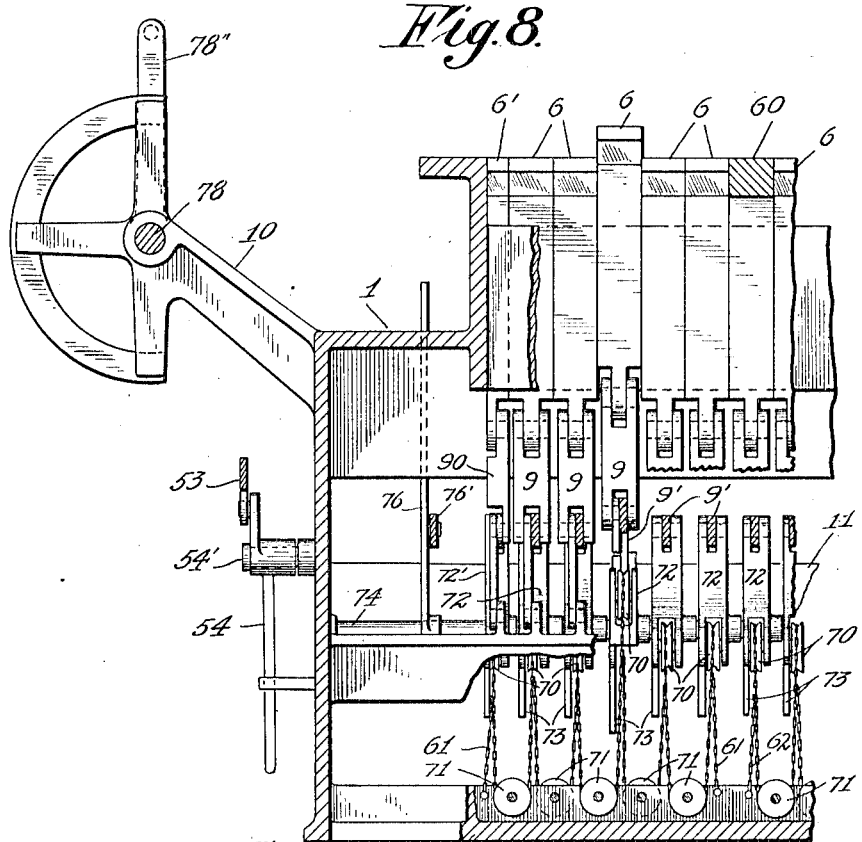
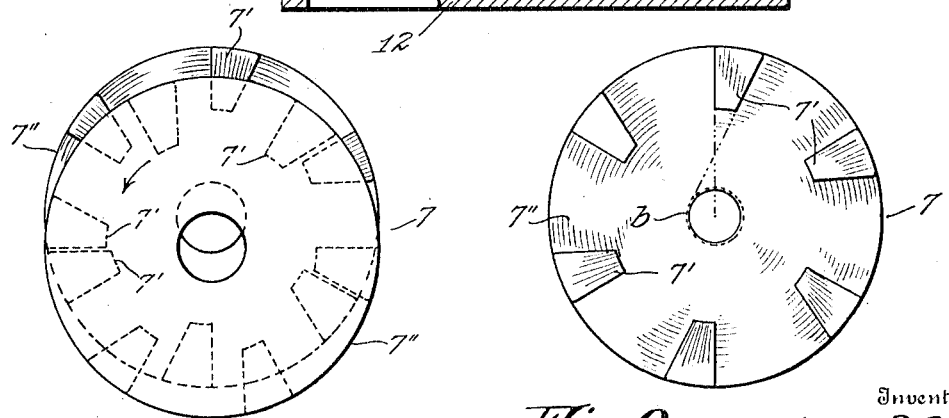

HARRY B. ROSS, OF SEATTLE, WASHINGTON.

PLANING-MACHINE.

1,090,236.     Specification of Letters Patent.     Patented Mar. 17, 1914.

Application filed December 19, 1910. Serial No. 598,225.

*To all whom it may concern:*

Be it known that I, HARRY B. ROSS, a citizen of the United States of America, and a resident of the city of Seattle, in the county of King and State of Washington, have invented certain new and useful Improvements in Planing-Machines, of which the following is a specification.

My invention is directed in particular to the production of an improved machine combining features of a duplex dimension planer adapted for working single or wide timbers or boards and which in operation may be quickly adjusted for simultaneously dressing two pieces of unequal thickness or to work one piece to special form while dressing another.

The invention embraces an improved sectional bed capable of ready adjustment for presenting in a common plane for surfacing common stock of relatively different thickness or of the same thickness as the run may be, and a novel arrangement for presenting cutting means to work edges of the stock to special form or dress the same as may be desired.

The invention further resides in a novel combination of changeable gage devices embraced in give and take connections whereby the machine may be quickly adjusted for different widths of stock.

Further objects and advantages will be set forth as the description progresses and those features on which I desire protection succinctly defined in the appended claims.

Figure 1:
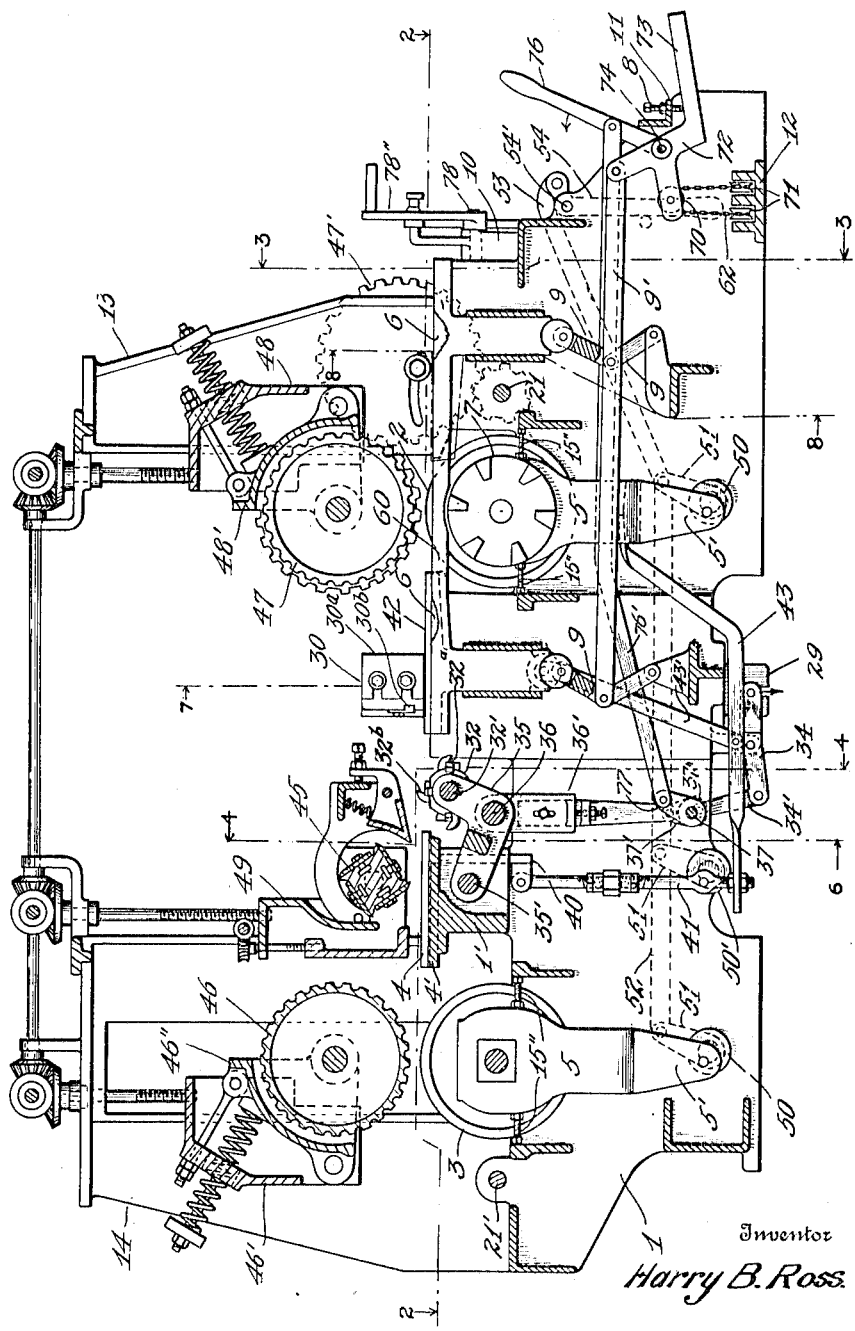
Figure 2:
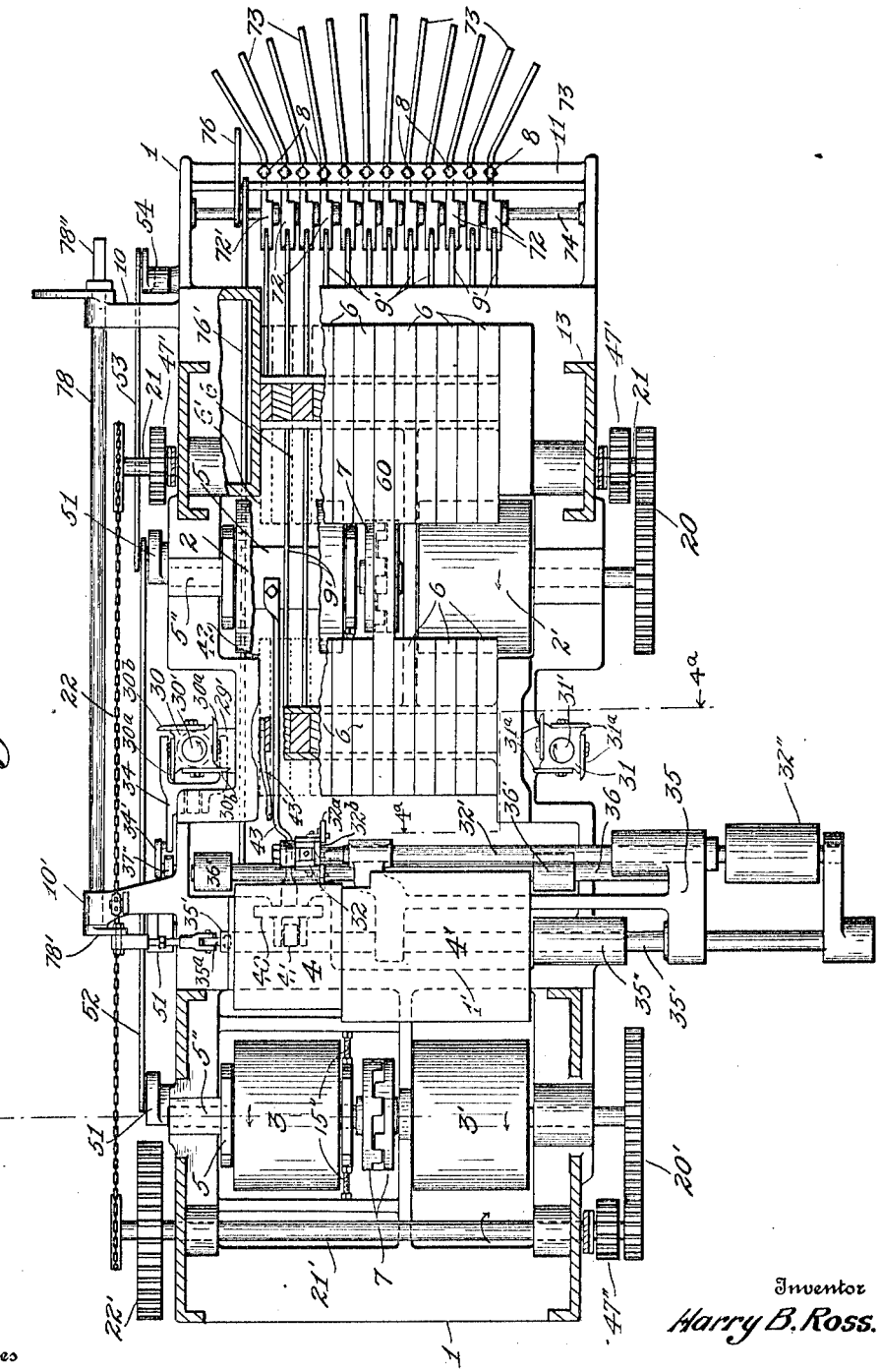
Figure 3:
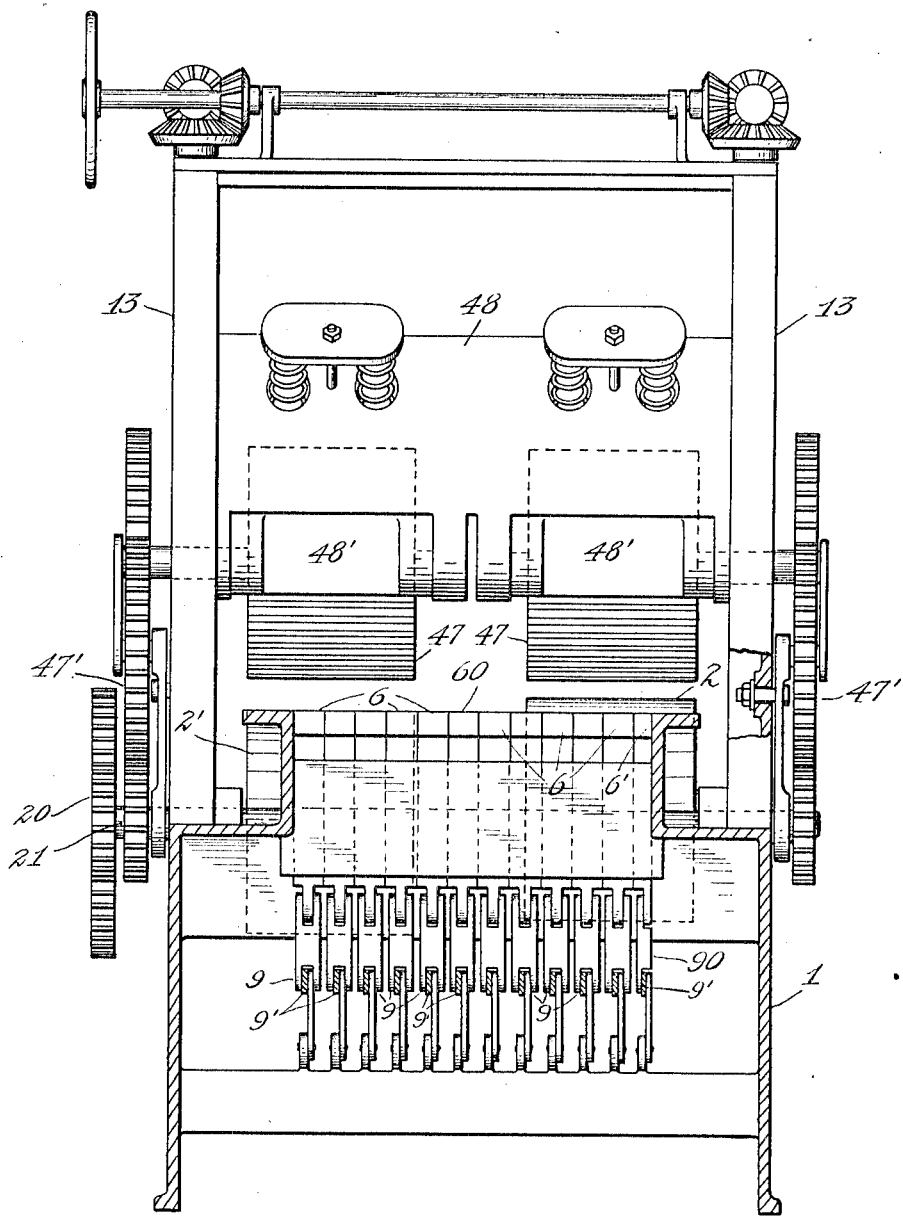
Figure 4:
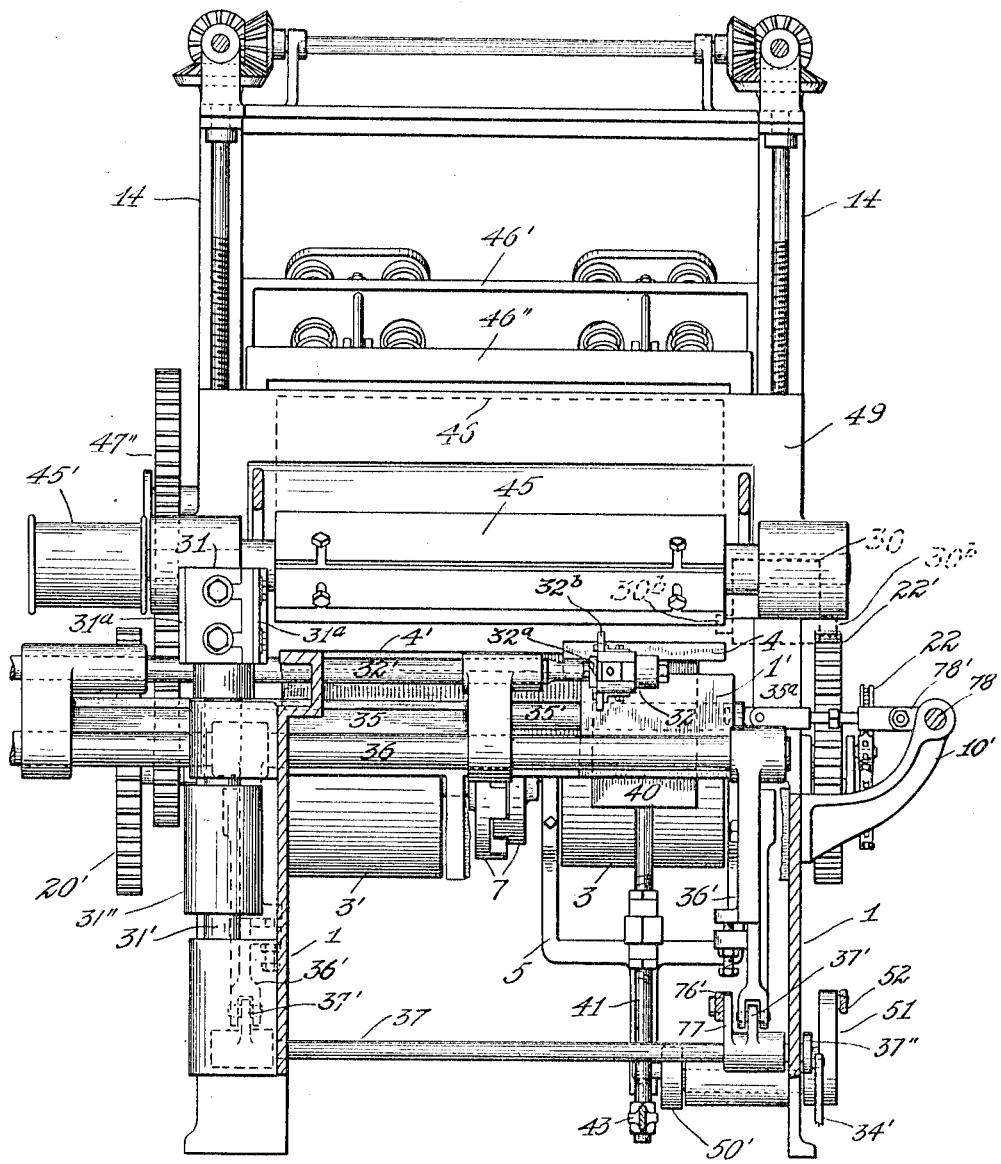

With reference to the accompanying drawings, wherein like reference numerals designate corresponding parts throughout: Figure 1 is a central vertical longitudinal section of a machine embodying the features of my invention in such form as now preferred by me. Fig. 2 is a horizontal section on line 2—2 of Fig. 1, portions of some of the parts being broken away. Fig. 3 is a transverse section on line 3—3 of Fig. 1. Fig. 4 is a transverse section on line 4—4 and 4ª—4ª of Figs. 1 and 2 respectively, portions of some of the parts being broken away. Fig. 5 is a fragmentary section on line 5 of Fig. 2. Fig. 6 is a fragmentary section on line 6 of Fig. 1. Fig. 7 is a fragmentary section on line 7 of Fig. 1. Fig 8 is a fragmentary section on line 8—8 of Fig. 1. Fig. 9 is a front elevation of one of the end drive gears or coupling members, and Fig. 10 discloses a pair of said gears in relative eccentric position.

In conjunction with a suitable frame, as 1, I provide bed sections comprising bearing members, as rolls 2, 3 and a platen 4 for one section and similar rolls 2', 3' and a platen 4' for another section. The rolls 2, 3 as shown, are journaled on vertically movable supports 5 in the form of yokes and connected by means of end-drive gears or coupling members, as 7, with the rolls 2', 3' respectively which are journaled in suitable bearings provided on frame 1, while platen 4 is provided with a stem 40 slidably mounted for vertical movement on a cross frame member 1' to which platen 4' is secured. The yokes 5 are steadied by engagement of their outer roll bearings 5" in vertical guide ways of frame 1, and by screws 15" seated on the inner arms of the yokes and engaging vertical frame surfaces, as clearly shown in Figs. 1, 2 and 5.

The gears 7 are of novel form, see Fig. 9, each comprising teeth 7' conveniently provided on one side face of a disk 7" and formed with inwardly converging faces one radial to the axis of the disk and the other on a tangent departing from a circle, as *b*, concentric with said axis and whose radius is substantially equal to the degree of eccentricity desired in the driving connection. While the teeth of companion gears 7 are identical in form they are reversely arranged on their respective backings or disks, whereby the radial faces of one set of teeth will meet the angular faces of the other set in parallel driving engagement when the gears are operating in proper relative eccentric positions, as indicated in Fig. 10. The disks of companion gears 7 are suitably secured to adjacent roll axles and the rolls 2', 3' connected by means of spur gears, as 20, 20', with cross shafts 21 and 21' respectively whch are journaled on frame 1 and connected by link belt gearing, as 22, for simultaneous operation through the medium of a drive gear 22', secured to shaft 21'. Gear 22', in operation of the machine, meshes with a suitable pinion secured to a counter shaft, not shown, which is properly driven to effect rotation of shaft 21' in the direction of the arrow in Fig. 2.

In connection with yokes 5, 5 and platen 4 I have provided adjustable supporting mechanism comprising cranks 50, 50 and 50', having journal extensions mounted in the adjacent side of frame 1 and secured at their outer ends to respective rock arms 51 which are pivotally engaged with a connecting rod 52. The cranks 50, as will be observed, are directly beneath the yokes 5 and are engaged with stem extensions 5' thereof, while crank 50' bears a like relation to platen 4 and is connected with stem 40 thereof by means of a link 41 in the form of a turn buckle. Secured to this link and to the forward yoke 5 is a bar 43 which is connected, by means of a link 43', with a vertically movable work support 42 arranged between roll 2 and platen 4 at the adjacent side of frame 1.

Connected with rod 52, by means of a link 53 is a bell crank lever 54 which, in the position shown in Fig. 1, serves to secure the adjusting mechanism from movement with rolls 2, 3, platen 4 and support 42 in raised position. In the present design, platen 4, rolls 2, 3 and support 42 when in their raised positions have suitable elevation to support stock substantially one inch above the plane of platen 4', whereby stock one inch thick may be worked in one bed section and two inch stock worked in the other bed section, as will be later understood. The relation of lever 54 to cranks 50 and 50' is such that one half turn of the lever on its fulcrum 54' effects adjustment of the cranks to lower the yokes 5 a suitable degree to bring the rolls 2, 3 into line with the rolls 2', 3' and likewise move platen 4 and support 42 to the plane of platen 4'.

Reference numerals 30, 31 designate cutter heads carried by vertical arbors 30', 31', mounted exteriorly of frame 1 at opposite sides thereof, and 32 indicates an intermediate cutter head carried by a transversely disposed arbor 32'.

In connection with the arbors 30' and 32' I have provided novel mechanism for supporting and shifting the same during operation of the machine, whereby the heads 30 and 32 may be readily adjusted to present supplemental and auxiliary cutting means, as will be later understood. In the arrangement shown, arbor 30' is steadied in frame bearings 29, 29' adjacent the support 42, and engaged with a step box 33 slidable in bearing 29 and pivotally connected with a shifter arm 34 having a relatively fixed fulcrum, see Figs. 1 and 7. While arbor 32' is journaled on a bracket 35 having a pivot 35' slidably engaged with a horizontal bearing 35'' on the opposite side of the machine frame 1. The bracket 35 has slidable engagement with a supporting rod 36 carried by depending arms 36' engaged with crank arms 37' of a cross shaft 37 which is seated in frame 1 and provided with a crank 37'' connected with a link extension 34' of arm 34. Angular adjustment of shaft 37 will therefore effect vertical movement of step box 33, through the medium of crank 37'', link 34' and arm 34, and also effect similar movement of bracket 35 through the medium of crank arms 37', arms 36' and rod 36.

Secured to the arbors 30, 31 and 32, respectively are pulleys 30'', 31'' and 32'' to which power is applied through the medium of belts driven from any suitable counter shaft, not shown.

The side heads 30, 31, as shown, are equipped with comparatively long jointing blades, as $30^a$ and $31^a$ respectively, but in addition thereto head 30 carries supplemental cutting means in the form of narrow blades $30^b$ which are arranged intermediate the blades $30^a$ with suitable projection beyond the cutting circle thereof to serve as rabbeting cutters when head 30 is properly adjusted relatively to the path of the work. The intermediate cutter head 32, as shown, is equipped with jointing blades or cutters $32^a$ which are suitably arranged for vertical cutting and are combined with auxiliary cutters or rabbeting blades $32^b$ adapted for horizontal cutting and to serve in conjunction with the blades $30^b$ of head 30 to work stock into shiplap.

While the cutters for heads 30, 31 and 32 may obviously be of different forms to those shown and described the arrangement and design as above set forth is such as I have found desirable in equipping the machine for working stock in one section into shiplap and sizing boards or dimension stuff in the other section or sizing boards or dimension stuff in both sections of the machine.

For each of the bed sections I provide a system of vertically movable work gages wherein each arm of the system is under control of the other arms for retraction. The arrangement of the gages in both bed sections is substantially the same and such that those in either section may be employed in conjunction with the side cutter head of the other section, as may be desired. In this provision gage devices, as 6, are arranged forwardly and rearwardly of the rolls 2 and 2' parallel with a similar device 60 extending between said rolls. These devices are conveniently in the form of bars provided with depending stem portions fitting one against another for vertical movement in suitable seats on frame 1, and connected with toggle supports, as 9, of substantially the same form as those disclosed in Patent No. 659,708 and likewise connected with links, as 9', which are engaged each with a respective lever 72. The work support 42, as will be observed, is seated in common with the rear gages 6, while a gage device 6' which defines the maximum width of work for cutter head 31 is seated in common with the forward gages 6 and supported on a toggle 90, and having link connection with a lever 72', fulcrumed with the levers 72, on a rod 74, supported on frame 1. These levers are provided with foot extensions 73 and normally engage adjustable stops 8 in the form of screws which are seated on a cross piece 11 of frame 1, as clearly shown. The provision for combining the gages in different systems comprises flexible members, as chain sections 61, and 62 which pass over guides 70 of respective gage levers and downwardly under intermediate guides 71 mounted on a cross piece 12 of frame 1. Each of these members is secured at its end to cross piece 12 with a slack allowance proportionate to the active movement of one of the gage levers combined therewith. Such movement of either lever of a system will therefore take up the slack, as indicated in the case of member 61 in Fig. 8, and place such lever under control of the other lever of the system for retraction. The lever 72 of the dividing gage 60, as shown, is engaged with member 62 which is connected with the levers 72 of the gages 6 combined with roller 2', while the lever 72' of gage 6' is engaged with member 61 which is connected with the lever 72 of the gages 6 in the movable bed section, see Fig. 8.

The upper works of the machine include a surface cutter, as 45, extending over the platens 4, 4', a delivery roll 46 directly over the rolls, 3, 3' and a pair of feed rolls 47 above the rolls 2, 2'. The provision for mounting and driving these upper members has no particular relation to the present invention and may be such as common in planing or sizing machines. In the form shown, however, rolls 47 are journaled on spring pressed swing brackets 48' carried by a cross head 48 mounted on vertical extensions 13 of frame 1, while roll 46 is journaled on a spring pressed swing bracket 46'' carried by a cross head 46' mounted on extensions of frame 1 in common with a cross head 49 on which cutter-cylinder 45 is journaled. Connected with these cross heads are the usual screw devices for hoisting and lowering the same to adjust the surfacing cutter and upper rolls. The rolls 47, as shown, are connected with cross shaft 21 by means of respective trains of gears as 47', and roll 46 is connected with shaft 21' by means of a similar train of gears 47'', while a driving pulley 45' is secured to the arbor of cutter cylinder 45.

76 indicates a lever pivotally supported on rod 74 and connected by means of a link 76' with a crank 77 of shaft 37 whereby the latter may be turned by movement of said lever to lower or elevate the cutter heads 30 and 32.

For effecting longitudinal adjustment of arbor 32' a rock shaft 78 is mounted on bracket extensions 10, 10' of frame 1 and provided with a crank 78' which is connected by means of a suitable link with a swivel extension 35ª of pivot 35' of the swing bracket 35. Secured to shaft 78 is a crank handle 78'' for effecting angular movement of the shaft when desired to vary the spacing of cutter head 32 with respect to the cutting plane of cutter head 30.

With cylinder 45 adjusted relatively to platen 4' for surfacing two inch stuff, and the rolls 2, 3, platen 4 and support 42 raised from the plane of platen 4', as shown in the drawings, the cutter heads 30, 32 may be simultaneously adjusted, by manipulation of lever 76, to position the rabbeting cutters 30ᵇ, 32ᵇ in the path of one inch stock passing from roll 2 to work the same into shiplap. If it be desired to simply surface and size the stock passing from roll 2, lever 76 is manipulated to lower head 32 to an inactive position and simultaneously shift head 30 to a position wherein the cutters 30ᵇ will travel clear of the stock. If it now be desired to run the machine double for surfacing and sizing stock of equal thickness, lever 54 is manipulated to effect lowering of the rolls 2, 3, platen 4 and support 42, as previously described.

Having thus described my invention, what I claim as new, and desire to secure by Letters Patent of the United States of America, is:

1. In a machine of the class described, a frame, cutting means mounted thereon, work supports opposing said means, rolls for the work arranged end to end, means supporting a roll and support for adjustment toward the cutting plane of said cutting means, and a rotation transmitting connection for said rolls interposed between the opposing ends of the latter.

2. In a machine of the class described, a frame, relatively fixed and vertically movable bed sections for supporting a common piece or different pieces of work, a surfacing cutter extending crosswise of said bed sections, a side cutter head for each bed section, one of said heads having main and auxiliary cutters, means supporting said last head for vertical movement to bring its auxiliary cutting means into or out of the path of the work, side cutters on the other of said heads, and means for feeding work in said bed sections.

3. In a machine of the class described, a frame, vertically adjustable means therein for supporting work, a cutter extending crosswise of said frame above said means, companion cutter heads adjacent opposite sides of said work supporting means, main and supplemental cutting means on one of said heads, said supplemental means extending beyond the plane of cut of the main cutting means, auxiliary cutting means carried by the other of said heads, and means supporting said heads for movement to bring said supplemental and auxiliary cutting means into the path of the work.

4. In a machine of the class described, a frame, a cutting means extending crosswise thereof, relatively fixed and vertically movable bed sections arranged side by side for supporting work beneath said cutting means, companion cutter heads spaced apart laterally of said frame for operation on the work on said vertically movable bed section, main and supplemental cutting means on one of said heads for cutting to relatively different depths, auxiliary cutting means on the other of said heads, and means supporting said heads for vertical movement to bring said supplemental and auxiliary cutting means into and out of the path of the work.

5. In a machine of the class described, a frame, a cutter extending crosswise of the frame, relatively fixed and vertically movable platens beneath said cutter, cutter heads spaced apart transversely of said frame adjacent said vertically movable platen for operation on a piece of work mounted on the latter, and means supporting said cutter heads for vertical movement.

6. In a machine of the class described, a frame, a cutter extending crosswise of the frame, platens beneath said cutter, means supporting one of said platens for vertical movement, side cutter heads, and means supporting one of said cutter heads adjacent to said last named platen for vertical movement.

7. In a machine of the class described, a frame, a cutter extending crosswise of the frame, adjoining platens beneath said cutter one of which is movable vertically, cutter heads at opposite sides of said frame adjacent said platens for operation on the work thereon, means supporting one of said heads for vertical movement, and a cutter head supported intermediate the sides of said frame for movement to and from the path of the work.

8. In a machine of the class described, a frame, a cutter extending crosswise of the frame, adjoining platens beneath said cutter, means supporting one of said platens for vertical movement, cutter heads at opposite sides of said frame adjacent said platens, means supporting one of said heads for vertical movement, an intermediate cutter head adjacent to said movable platen, for operation on the work thereon, and means supporting said intermediate head for vertical and horizontal movements.

9. In a machine of the class described, a frame, a cutter extending crosswise of the frame, adjoining platens beneath said cutter, means supporting one of said platens for vertical movement, cutter heads spaced apart laterally of said frame, and means supporting said cutter heads for simultaneous vertical movement.

10. In a machine of the class described, a frame, a cutter extending crosswise of the frame, platens arranged side by side beneath said cutter, feed rolls mounted on said frame, supporting rolls arranged end to end beneath said feed rolls and spaced from said platens lengthwise of said frame, and means supporting one of said platens and one of said supporting rolls for vertical movement.

11. In a machine of the class described, a frame, a cutter extending crosswise of the frame, adjoining platens beneath said cutter, cutter heads at opposite sides of said frame, a cutter head intermediate the sides of said frame having cutters arranged for producing vertical and horizontal cuts, means supporting one of said side heads and the intermediate head for vertical adjustment, said vertically movable side head having a cutter for producing vertical and horizontal cuts, feed rolls mounted in said frame forwardly and rearwardly of said first cutter, work supporting rolls forwardly and rearwardly of each of said platens, and means supporting one of said platens and its work supporting rolls for vertical movement.

12. In a machine of the class described, a frame, a cutter extending crosswise of said frame, adjoining platens, means supporting one of said platens for vertical movement, a vertically disposed cutter head supported for vertical movement adjacent to one side of said movable platen, a horizontally disposed cutter head supported adjacent the other side of said movable platen for horizontal and vertical movements, and cutters on each of said heads for producing vertical and horizontal cuts.

13. In a machine of the class described, a frame, a cutter extending crosswise of the frame, work supporting means beneath said cutter, cutters at opposite sides of said frame, work supporting rolls spaced apart laterally of said frame, vertically movable devices arranged side by side forwardly and rearwardly of each of said rolls for gaging work for said side cutters, and a vertically movable gage device extending between said rolls.

14. In a machine of the class described, a frame, work supports spaced laterally of the frame, cutter heads at opposite sides of said frame, vertically movable devices arranged side by side forwardly and rearwardly of each of said work supports for gaging work for said cutter heads, and a vertically movable gage device extending between said work supports.

Signed at Seattle, Washington this 10 day of December 1910.

HARRY B. ROSS.

Witnesses:
Frank E. Adams,
Arlita Adams.